United States Patent [19]
Fischthal

[11] Patent Number: 5,822,741
[45] Date of Patent: Oct. 13, 1998

[54] NEURAL NETWORK/CONCEPTUAL CLUSTERING FRAUD DETECTION ARCHITECTURE

[75] Inventor: Scott Fischthal, Gaithersburg, Md.

[73] Assignee: Lockheed Martin Corporation, Bethesda, Md.

[21] Appl. No.: 595,457

[22] Filed: Feb. 5, 1996

[51] Int. Cl.[6] .................................................. G06F 15/18
[52] U.S. Cl. .............................................. 706/16; 705/31
[58] Field of Search ................................. 395/11, 22, 13, 395/23; 705/31, 38, 44, 4, 2

[56] References Cited

U.S. PATENT DOCUMENTS

| | | | |
|---|---|---|---|
| 4,760,604 | 7/1988 | Cooper | 706/15 |
| 4,897,811 | 1/1990 | Scofield | 706/27 |
| 4,958,375 | 9/1990 | Reilly | 382/159 |
| 5,224,173 | 6/1993 | Kuhns | 382/116 |
| 5,239,594 | 8/1993 | Yoda | 395/11 |
| 5,253,164 | 10/1993 | Holloway | 705/2 |
| 5,276,772 | 1/1994 | Wang | 706/20 |
| 5,325,466 | 6/1994 | Kornacker | 395/50 |
| 5,359,699 | 10/1994 | Tong | 395/22 |
| 5,577,169 | 11/1996 | Prezioso | 395/61 |

OTHER PUBLICATIONS

Wing–kay Kan et al., "A Probabilistic Logic Neuron Network for Associative Learning" Jun. 1987, IEEE First Inter. Conf. on Neural Networks, pp. 11–542—11–548.

Ryszard S. Michalski et al., "Learning from Observation: Conceptual Clustering" 1983, from *Machine Learning: An IA Approach* Eds. R.S. Michalski et al., Morgan Kaufmann, pp. 331–363.

Donald L. Wenskay, "Neural Networks: A Prescription for Effective Protection" Aug. 1991, The Computer Lawyer, vol. 8, No. 8, pp. 12–23.

Byoung–Tak Zhang et al., "Distributed Parallel Cooperative Problem–Solving with Voting and Election System of Neural Learning Networks" Dec. 1990, pp. 513–516, Div. I Artificial Intelligence Inst. for Com. Science.

Alan Rojer et al., "A Multiple–Map Model for Pattern Classification" Nov. 1988, Neural Computation, pp. 104–115.

Amir F. Atiya, "An Unsupervised Learning Technique for Artificial Networks" 1990, Neural Networks, vol. 3, No. 6, pp. 707–711.

Suresh Mangrulkar, "Artificial Neural Systems" Dec. 1990, ISA Transactions, vol. 29, No. 1, pp. 5–7.

Kohonen, J. et al. "LVQ–PAK: The Learning Vector Quantization Program Package", Version 2.1, Oct. 1992, prepared by LVQ Programming Team of Helsinki University of Technology, Lab. of Computer & Info Science.

Baim, P.W., "A Method for Attribute Selection in Inductive Learning Systems" IEEE Transactions on PAMI 10:6, pp. 888–896, 1988.

Fischthal, S.M., Cluster/2C++Object Oriented Low Level Design and Code Documentation, unpublished paper, George Mason University Center for Artificial Intelligence, 1994.

Drucker et al., "Boosting and Other Machine Learning Algorithms", Machine Learning: Proceedings of the 11th International Conference, eds. W.W. Cohen and H. Hirsch, New Brunswich, NJ Jul. 1994, pp. 53–61.

Fahlman, S. et al., "The Cascade–Correlation Learning Architecture" Advances in Neural Information Processing, 2nd Ed., D. Touretzky, Morgan Kaufmann, pp. 524–533, 1990.

*Primary Examiner*—Allen R. MacDonald
*Assistant Examiner*—Jeffrey S. Smith
*Attorney, Agent, or Firm*—William H. Steinberg

[57] ABSTRACT

The invention relates to an apparatus for detecting fraud using a neural network. The architecture of the system involves first employing a conceptual clustering technique to generate a collection of classes from historical data. Neural networks are provided for each class created by the clustering step and the networks are trained using the same historical data. This apparatus is particularly useful for detecting the incidence of fraudulent activity from very large amounts of data such as tax returns or insurance claims.

15 Claims, 3 Drawing Sheets

NEURAL NETWORK/CONCEPTUAL CLUSTERING FRAUD DETECTION ARCHITECTURE

This invention was made with support from the Internal Revenue Service. The Government has certain rights in this invention.

This invention relates to an improved method to recognize and detect significant features from events represented by very complex patterns of data using integrated artificial intelligence techniques. The architecture of the system involves first employing a conceptual clustering technique to generate a collection of classes from historical data. Neural networks are provided for each class created by the clustering step and the networks are trained using the same historical data. Each network is uniquely trained in response to the output class generated by the conceptual clustering step. Events from a database containing unknown properties which require the detection of a particular feature or characteristic are then classified according to the classification scheme and assigned to the artificial neural networks responsive to the class. The neural network is more effective and efficient at its detecting task after first classifying the events according to the conceptual clustering step. The method is particularly useful for detecting the incidence of fraudulent activity from very large amounts of data such as in connection with the filing of tax returns or insurance claims.

BACKGROUND OF THE INVENTION

Two of the major subfields of artificial intelligence are generally known as knowledge-based systems and artificial neural nets. Knowledge-based approaches rely on the creation of a heuristic or rule-base which is then systematically applied to the particular problem or data. Knowledge-based systems, also referred to as expert systems, are capable of making inferences or decisions based on an explicit if-then production rule system. The creation of a knowledge-based system is dependent on extracting a high degree of knowledge about a limited subject from an expert. To create such a system, virtually all possible solutions to a given problem are attempted to be anticipated by an expert. This information is then provided to a programmer or "knowledge engineer" who then writes a series of instructions to be followed by the computer. The computer can then respond to a question by reference to an internal list of rules to follow given certain input information to produce its respective answer. Although expert systems have been employed with some success at finding solutions for complex problems, they require extensive programming efforts and the ability of an expert to anticipate virtually every possible solution to a given question. Furthermore, in many instances the experts themselves may not agree on the rules. In some applications, the sheer size of creating and maintaining a rule-base makes the use of an expert system impractical. Some types of problems simply cannot be conformed to solution by expert systems because the solution to the problem cannot be easily translated to a set of rules which can be clearly articulated.

Artificial neural networks or neural nets have also emerged as a successful information processing technique effective at solving complex problems such as pattern recognition, classification and completion, feature extraction, optimization, signal processing, control engineering, speech recognition and function approximation problems. Neural networks can often discover relatively complex rules or relationships among data and are often particularly effective in circumstances where large amounts of training data is provided. The neural network is formed by linking a plurality of simple processing elements with a dense set of interconnections having variable weights or strengths. The individual processing elements, referred to as neurodes, can accept input signals and likewise transmit output signals to a large number of other neurons or nodes.

The neural network or artificial neural system is defined by a plurality of these simple, densely interconnected processing units which operate in parallel. The function of the neural net is determined by the network structure, connection strengths and the processing performed at the computing elements or nodes. Neural network architectures can be implemented in hardware, software or a combination of both. One of the major drawbacks of software simulations is they are often too slow to train to be of practical value because they rely on the sequential operation of a digital computer.

Each network paradigm consists of the features of the neural network solution which distinguishes it from other neural networks. Typically these features are the connection scheme, the transfer function and the learning algorithm of the network. In contrast to a digital computer, a neural network does not have a separate stored memory, but instead the memory or stored knowledge of the system is represented in the network in a pattern of variable interconnecting weights among the neurodes. The respective weight assigned to a particular neurode is dynamic and is modified in response to training. Because of its structure, a neural network is able to generalize and can "learn" the characteristics of a general category of objects based upon a series of specific examples from that category. Thus in use, the networks do not require pre-programming that will anticipate all possible variants of the input data they will receive. Neural networks may be supervised or unsupervised. In supervised systems, a learning algorithm is incorporated which adjusts the connections of the network for optimal performance based on the presentation of a predetermined set of correct stimulus-response pairs. Rather than attempting to anticipate every possible exhibition of data, artificial neural nets attempt to recognize patterns of data and make decisions based on the conformity with historical patterns having known attributes. The training of neural networks involves an iterative process where individual weights between synapses are repeatedly adjusted until the system converges to produce a derived output. While training a neural network may be time consuming, it is not labor intensive and avoids the necessity to develop an explicit algorithm. In essence, after training the architecture of the neural network embodies the algorithm. The techniques and algorithms for training neural networks are numerous and diverse, each having certain advantages and disadvantages.

In contrast to supervised systems, unsupervised systems require no historical training data to train the system. The neural net is autonomous and as such it can determine some properties about data and reflect these properties in an output. Unsupervised neural nets take into consideration not only the properties of individual events but the event's relationship with other events and the event's relationship to predetermined concepts which characterize the event collection. One unsupervised learning technique, conjunctive conceptual clustering, was first developed in the early eighties by Stepp and Michalski. A detailed explanation of the technique is disclosed in their article; Michalski, R. S., Stepp, R. E. "Learning from Observation: Conceptual Clustering", Chapter 11 of *Machine Learning: an Artificial Intelligence Approach*, eds. R. S. Michalski, J. G. Carbonell and T. M. Mitchell, San Mateo: Morgan Kaufmann, 1983.

Notwithstanding their success, neural nets have a number of limitations which restrict their utility. In particular, the recognition of very large and/or very complex patterns of data by neural network systems presents significant difficulties. In complex application areas, networks often require larger sets of training data and, as the size of the data sets increases, the systems will suffer the consequences of prolonged training and processing times. Events which are characterized by a large number of variables generally require extremely long processing time, particularly where the data is not linearly separable. Despite the respective strengths of neural networks, when a problem is very complex, involves large amounts of input data or when it relies on an intuitive understanding of the problem, neural nets have not been particularly effective. Input signals from large databases or event sets normally contain too much irrelevant information for event classification. The signals form complex patterns that cannot be easily broken down into a series of sub-problems which have an identifiable number of solutions.

One approach using artificial intelligence techniques to solve very complicated problems, is to employ multiple classifiers arranged in a parallel configuration. Each classifier can be focused or trained to respond to a particular aspect or feature of the input pattern. Although the individual classifiers can identify the presence of a particular feature in a complex pattern, the cohesive integration of the output from the multiple classifiers to produce accurate, precise and certain classification results has proven difficult.

Because of the difficulties in extracting large scale trends in connection with complex problems, these problems are often handled by humans which must exercise subjective judgment. For example, problems related to the recognition of handwriting, identifying good mortgage risks and the detection of fraud in connection with government provided services often relies on the judgment of an expert. The detection of criminal fraud directed against the government on tax returns, social security and government supported health care is a particularly important complex problem and such fraud is estimated to cost taxpayers billions of dollars per year. Another complex problem, the detection of credit card fraud, costs financial institutions millions of dollars a year. In view of the sums of money involved, significant efforts have been directed to detect such fraudulent activity but due to the very large volume of data involved, it is infeasible to manually review, analyze or otherwise intervene with respect to each tax return, benefit claim or credit record. Because there are few, if any, clear rules for performing such fraud detection, past attempts to solve the problem using such rule-based or deterministic approaches have been unsuccessful. Likewise, statistical approaches to the problems have not been particularly effective. The Internal Revenue Service presently uses statistical methods to reduce the number of returns which are manually investigated for fraud but only a small minority of the returns identified by the currently employed statistical methods actually turn out to be fraudulent. As a result, human investigators are caused to spend a great deal of time examining returns which are ultimately found to be non-fraudulent. Also, there is a significant false-negative rate which is not detected by current techniques. Although this rate is not known with certainty because the extent of undetected fraud remains unknown, there is evidence that a great deal of fraud remains available to be detected. There is almost a linear relationship between the labor applied by the Internal Revenue Service to fraud detection and the amount of fraud which is uncovered.

Efforts using artificial intelligence based methodologies applied to complex problems involving large volumes of data such as identifying fraudulent tax returns or insurance claims have not been particularly successful. For example, attempts to identify fraudulent tax schemes using learning vector quantization techniques have not produced reliable results. See Kohonen, J., Kangas J., LVQ-PAK: A Program Package for the Correct Application of Learning Vector Quantization Algorithms, *Proceedings of the International Joint Conference on Neural Networks*, Vol. I, pp.725–30 Baltimore, June 1992. This supervised learning approach uses a set of "codebook vectors" which approximate the domain of the input vectors. A probability distribution model of an input data set is replaced with a smaller proportional representation of vectors that represents the input data features. The algorithm then places the test vectors into the codebook domains based on nearest neighbor style differences.

The type of problem presented by fraudulent tax returns or insurance claims would appear to be amenable to solution by employing appropriately designed artificial intelligence methodologies. Many difficult and tedious tasks that are presently performed by highly trained but nevertheless fallible experts could be performed using such systems. Accordingly, it is the object of the invention to provide an automated approach to efficiently and accurately detect fraud from large amounts of input data.

It is another object of the invention to provide an event class separator and identifier which can separate and identify classes of events with a wide variety of features yet enable the classes to be symbolically understood.

BRIEF SUMMARY OF THE INVENTION

According to the invention, a system and method for solving complex problems is provided that combines and integrates several artificial intelligence techniques. The concept behind the invention involves first transforming a complex representation space or event where a function approximator is difficult to build into a simpler representation. When provided with a simplified representation an approximator is easier to generate. Using this technique, an event from a database characterized by a multidimensional array of vectors may then be separated into one of a plurality of conceptually cohesive classes. In the invention, the transformation of the representation space is accomplished by the conceptual clustering technique. The conceptual clustering step can provide a classification of historical events in a symbolic representation. To implement the conceptual clustering step, one begins with a predetermined number of variables or vectors from the event set and then the conjunctive conceptual clustering algorithm is applied to the data. The program implementing the algorithm generates a number of classes which can be symbolically understood.

After a set of classes is generated from the event set, a second set of variables from the event set is provided to each of a plurality of artificial neural networks. The neural networks are oriented in a parallel configuration. A separate neural network is trained for each class identified in the conceptual clustering step using the historical data. The output signal of the neural network system can therefore be customized to provide a solution to the specific problem to be resolved.

The method disclosed is particularly useful to recognize and detect patterns from very large and complex data fields. In a preferred embodiment, the method is applied to detect the incidence of fraud in connection with tax returns or insurance claims. A valuable advantage of the detection method according to the invention is the creation of symbolically understandable classes by the conceptual clustering step. Because the classes can be intuitively understood, a user can initiate remedial procedures in response to the fraud patterns displayed in a particular class.

For example, application of the methodology to detect fraud in connection with tax returns can enable an investigator to identify certain recognizable taxpayer classes which are more likely to commit fraud. Because the classes can be symbolically understood, the investigator can increase auditing and/or implement additional reporting requirements in the class identified as having atypical rates of fraudulent activity. The approach integrates several heuristics to result in an effective automated detection system which can discover fraud that is not ordinarily detectable using standard distributed processing or neural network approaches.

DESCRIPTION OF THE DRAWINGS

The foregoing and other objects, aspects and advantages will be better understood from the following detailed description of the invention with reference to the drawings, in which.

DETAILED DESCRIPTION OF THE INVENTION

Figure 1:
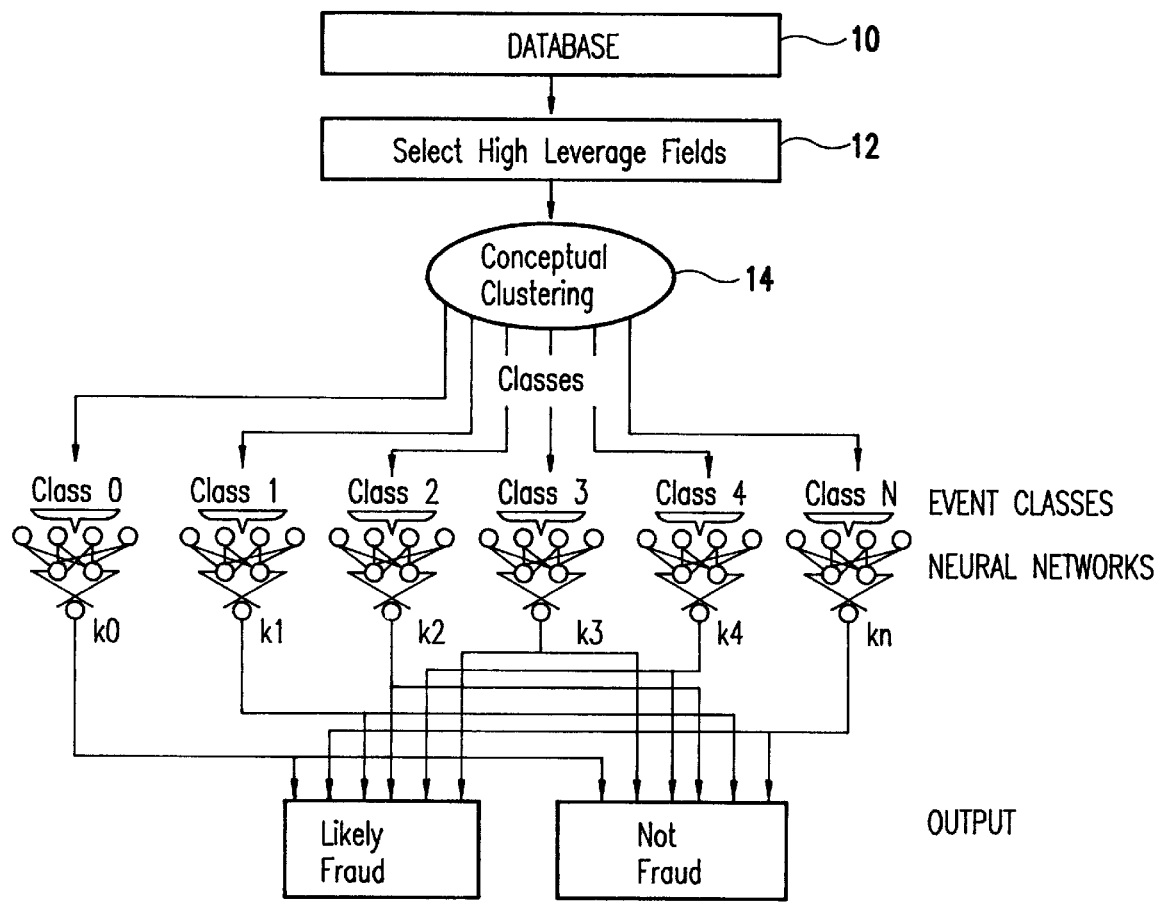
FIG. 1 is a schematic block diagram representing the overall architecture of the system.

Referring first to FIG. 1, a broad schematic representation of the architecture employed in accordance with the invention is shown. The system involves first providing a historical database 10 which represents a set of events with known characteristics. The historical database may contain large amounts of data relating to a large number of events. Events represented by the data in the database which are appropriate for processing by the detection system and method are typically characterized by a large number of fields presented as vectors. An event in the database can represent information from a document, record, analog signal, or virtually any pattern of data. Each event may contain any number of fields or variables and can be described as multidimensional. An event is thus defined as a description of an object or pattern of data in the form of a set of vectors or values of the assumed variables. From the database 10, certain vectors or fields are selected in a first selection procedure 12. These vectors are provided as input to the conceptual clustering step 14.

The conceptual clustering step processes a first set of input data selected from the historical database in an unsupervised manner to create a set of conceptually cohesive classes, class 1 through class N. Data which does not meet the criteria of any of the classes created are assigned to class 0. For each class created a separate and independent neural network is also created.

The neural networks are identified as K0 through Kn. Each neural network is trained using data from the historical database to produce the desired output characteristics. FIG. 1 shows a network designed to differentiate between likely existence of fraud present in a given event and no fraud.

Figure 2:
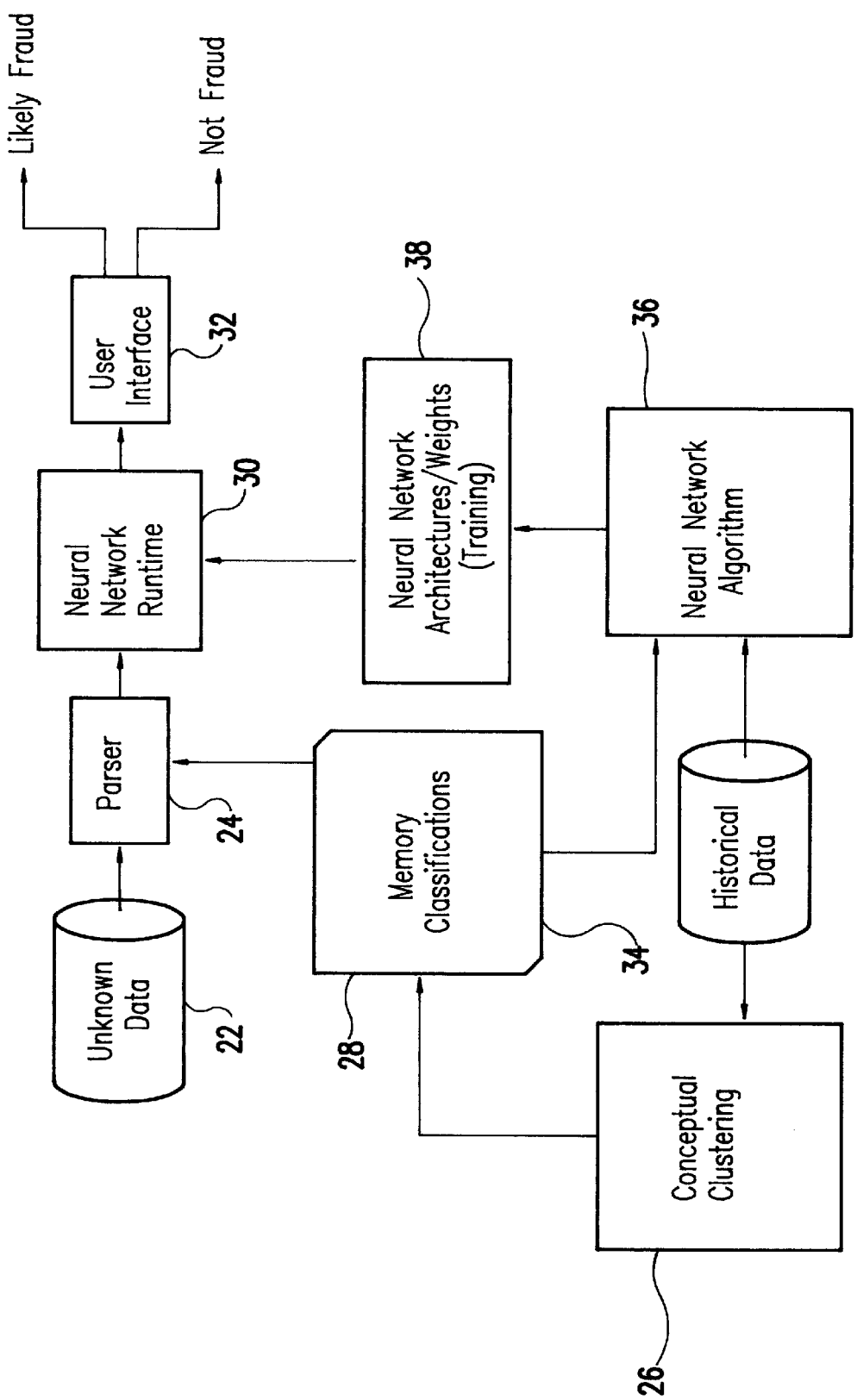
FIG. 2 is a flow diagram depicting the flow of information in the system.

FIG. 2 shows a schematic representation of the flow and processing of data in the system. Creation of the system first involves the selection of a first set of vectors from the database of historical events 34. The selected vectors are provided as input into the conceptual clustering program 26. A preliminary step in creating the classification and detection system according to the invention is to chose appropriate features from the historical database that may be useful in the detection or classification scheme. The features or variables may be selected manually using expert knowledge or by using automated approaches. One automated approach to select the first set of vectors uses the VARSEL system. (see Bain, P. W. "A Method for Attribute Selection in Inductive Learning Systems", *IEEE Transactions on PAMI* 10:6, pp.888–96, 1988.) The VARSEL system can select features or variables that seem most correlated to the classification of vectors, using an information theoretic measure.

The algorithm used in connection with the VARSEL system proceeds as follows:

Assign each value of each attribute to a single "correct" class, based on in which class it is most heavily represented (e.g., if value 2 of feature x appears in 50% of all samples associated with class 1, 30% of those in class 2 and 40% of those in class 3, its "correct class" is class 1).

Calculate a likelihood of error:

$$l_{e,M} = \frac{1}{m-1} \left( \frac{n_{e_1}}{N_{e_1}} + \frac{n_{e_2}}{N_{e_2}} + \ldots + \frac{n_{e_2}}{N_{e_2}} \right)$$

where $n_{ei}$ is the number of times the attribute value ends up in the "incorrect" error class I and $N_{ei}$ is the total number of samples in class I.

The total error likelihood for an attribute is thus just the sum of the error likelihoods of all its values and the relevance of an attribute is its likelihood of correctness, i.e., $$1 - \sum_{M=1}^{v} l_{e,M}$$

where v is the size of the attribute's domain.

An alternative manner to automatically select these variables for the conceptual clustering step is to employ genetic algorithms. Genetic algorithms can generally be described as optimization programs which start with a set of encoded procedures, randomly mutate the set and then employ a process to select the mutants with high fitness. The selected mutated procedures can then be recombined with other selected procedures.

After the variable selection step is complete, the selected variables may be stored in a memory which can be accessed in response to a user input. The input data from these variables is then subjected to the conjunctive conceptual clustering step 26. Conceptual clustering generates a classification scheme having classes based more upon their concepts rather than on a statistical measure of similarity or groupings. The basic idea behind conceptual clustering is to obtain easily interpreted classes which are conceptually cohesive and as a result a user can clearly understand the generated classes in symbolic terms. In contrast, statistical clustering or network classification approaches often result in classes that cannot be easily explained or understood symbolically and, as a result, the information is not in a form which is particularly useful to an investigator. Furthermore, a logical or intuitive explanation of the classes cannot be provided. The selected variables are then used in the conceptual clustering step to build a series of separate classes based on differences in the respective variables. The conceptual clustering step then determines a number of classifications based on the preselected variables and certain criteria provided by the user such as sparseness, simplicity. The result of the conceptual clustering step is the creation of some number of classes which, in some intrinsic sense, seem internally similar. These classes may then be stored in memory 28.

The basic algorithm for the conceptual clustering step proceeds as follows:

1) Initial seeds are determined.

From the given collection of events E, k events (the initial seeds) are selected. The seeds may be chosen randomly or according to some criterion. (After this first step, seeds are always selected according to certain rules; see step 5).

2) Stars are constructed for each seed.

For each seed $e_j$, a reduced star $RG_j(e_o|E)$ is constructed by the Redustar procedure, where $E_o$ is the set of remaining seeds. The Redustar procedure, explained by Michalski and Stepp, generates a star and then maximally reduces the sparseness of each complex in it while preserving the coverage of observed events.

3) An optimized clustering (A disjoint cover of E) is built by selecting and modifying complexes from stars.

Every combination of complexes, created by selecting one complex from each star, is tested to see whether it contains intersecting complexes. If so, the complexes are made disjoint by the NID procedure. The NID procedure, also fully explained in Michalski and Stepp, involves transforming a set of nondisjoint complexes into a set of disjoint complexes.

4) A termination criterion is evaluated.

If this is the first iteration, the obtained clustering is stored. In subsequent iterations the clustering is stored only if it scores better than previously-stored clustering according to the "Lexicographical Evaluation Functional with tolerances" (LEF) Michalski, 1980. The LEF algorithm terminates when a specified number of iterations does not produce a better clustering (This number is defined by a termination criterion as described below).

5) New seeds are selected.

New seeds are then selected from sets of observed events contained in complexes of the generated clustering, one seed per complex. Two seed-selection techniques may be used. One technique selects "central" events, defined as events nearest the geometrical centers of the complexes (as determined by the syntactic distance). The other technique, stemming from the "adversity principle," selects "border" events, defined as events farthest from the centers. Ties for central or border events are broken in favor of events which have not been used recently as seeds. The technique of selecting central events is used repetitively in consecutive iterations as long as the clustering improves. When the improvement ceases, border events are selected.

After selecting seeds, a new iteration of the algorithm begins from step 2.

In connection with an application of a preferred embodiment of the invention, a CLUSTER2 program was employed to establish classes of taxpayers. CLUSTER2 source code is available from the George Mason University Machine Learning and Inference Laboratory, Fairfax, Va. (See, Fischthal, S. M., CLUSTER/2C++*Object Oriented Low Level Design and Code Documentation*, unpublished paper, George Mason University Center for Artificial Intelligence, 1994.) Proceeding to the next task, the neural network classifier 30 must be created and trained. The creation of the neural network is represented in FIG. 2 by reference numeral 36.

In the preferred embodiment of the invention, each class is assigned to a trio of networks. The neural nets for each class can be implemented using software using the following algorithm:

Select a training set size s(c) for each class c produced by CLUSTER/2.

Next produce the "first" network for each class. This involves selecting a vector from a training set pool p from the historical data 34 and removing it. The class in which c fits is then determined and it is placed in the training set for class c. This procedure is repeated until the training set for each class is the size s(c). Extra vectors are returned to the training set pool. This first network is then trained for each class c using a cascade collection technique.

A "second" network for each c is then produced. The steps involved in this proceed as follows:

A. Flip a fair coin. If heads set t=misclassified; else set t=correct.

B. If t=misclassified then:

I. select a vector v from the training set pool p, removing it from p.

ii. Test v on the first network of the class c that it belongs to.

iii. If v is correctly classified, put v in a new pool p' and rerun the last two steps; otherwise, put v in the training set for the second network of class c, flip the coin again and continue from the top of the heuristic for the second network generation.

C. If t=correct, then do as for t=misclassified, but discard the misclassified vectors and keep the correctly classified ones instead.

D. Continue until the training set for the second network for each c is of size s(c).

E. Return all vectors in p' to p.

F. Train this second network in each class c following standard techniques using cascade correlation.

Finally, a "third" network for each c is produced. The steps followed to produce this network proceed as follows:

A. Select a vector v from the training set pool p, removing it from p.

B. Test v on both the first and second networks of the class c that it belongs to.

C. If the output classifications of these two networks are the same, put v in p'. Otherwise, add it to the training set for the third network of c.

D. Continue until the training sets for each c are of size s(c).

This procedure involves a boosting algorithm which was disclosed by Drucker et al., "Boosting and Other Machine Learning Algorithms," *Machine Learning: Proceedings of the 11 th International Conference*, eds. W. W. Cohen and H. Hirsch, New Brunswick, N.J. 7/94, pp. 53–61.

The neural networks employed in the architecture according to a preferred embodiment of the invention are supervised feed forward and thus the signal pathway proceeds in a single direction from the input layer to the output layer. The invention will work with other types of networks besides feed forward and will work with other inductive reasoning tools such as AQ and ID3. Because learning in the preferred embodiment is supervised it therefore requires labeled training data and an external teacher. The system must be first operated in a learning or training mode 38 in order to train each of the neural networks created, k0 through kn. The neural networks created in the preceding step are then trained. The selection of the features or variables used for training the neural network may be performed in a manner analogous to the feature selection step performed before the conceptual clustering step for event classification. Again, the selection of these features may be determined using expert knowledge, VARSEL or by genetic algorithm. The fields (or variables) selected for the neural network step are not the same as those selected in the conceptual clustering step because the fields which are used to determine the classification of an event are not necessarily appropriate for performing the desired detection step. The number of variables selected in both the conceptual clustering step and the neural network stage should be limited to those that have the ability to distinguish or be relevant to the detection problem. After the second set of variables has been selected for the training procedure, a neural network is established for each of the respective classes.

In the training mode, weighing factors, multipliers and threshold levels within the neural net are modified so that the system will recognize patterns it has never been exposed to before. The system requires a controller when in the training mode which modifies the weighing factors, multipliers and threshold levels as explained in the cascade correlation algorithm. During training, the network's response to signals passing along certain pathways is sensitized. The net result is that the strength of certain interconnections among neurodes increases.

In the preferred embodiment of the invention the training is performed using the cascade correlation learning algorithm. Cascade correlation is an approach to feed forward-only, supervised neural network learning and is faster to train than traditional backpropagation because it uses empirical performance enhancements. Both the cascade correlation learning algorithm and an enhancement known as "QuickProp" were developed by Scott Fahlman in the 1980's. Cascade correlation uses some of the QuickProp principles. See Fahlman S., Lebiere, C. "The Cascade-Correlation Learning Architecture" *Advances in Neural Information Processing,* 2nd Ed., D. Touretzky, Morgan Kaufmann, 524–32, 1990. Fahlman, S. E. "Faster Learning Variations on Backpropagation: An Empirical Study", *Proceedings of the* 1988 *Connectionist Models Summer School,* Morgan Kaufmann 1988. Cascade correlation does not require ad hoc architecture but grows network nodes during training. The node is the functional grouping of neurodes that acts as a single unit within one layer of a network.

After the system has been created and modeled to a particular set of data and a particular detection problem, data from an event set with unknown characteristics is provided as input to the system. As best seen in FIG. 2, the unknown data set or customer data 22 is processed according to a parser program 24 which assigns each event to one of the classes predetermined by the conceptual clustering program 26. The parser program compares the preselected vectors against the respective classes from the classification scheme which have been stored in a memory 28 in a sequential order to determine and assign the event to the correct class. After the event has been assigned to a class, a second set of predetermined vectors is provided as input to the neural network 30 which corresponds to the class. The neural network then processes the information and provides a response to the particular problem which is then communicated at an appropriate User interface 32.

A preferred contemplated application for the disclosed detection technique is to detect the incidence of fraudulent tax returns from a database containing information from tax returns. According to FIG. 2, the user interface provides output directed at the likelihood that a particular tax return is fraudulent. In the context of this application, features, fields or variables are first selected using expert knowledge from a historical database 34 to attempt to identify data features from the returns that would be helpful in segregating taxpayers into identifiable classes from a database containing information from tax returns. Variables are selected using expert knowledge or by one of the automated methodologies as described above. The individual or automated technique selecting the features attempts to identify those features which are likely to be relevant to use to detect fraud. For example, if an expert suspects that information regarding the filing status of a taxpayer may be probative, correlative or relevant to his or her propensity to commit fraud, this particular feature can be selected as an input vector.

Classes of taxpayers are determined by the conceptual clustering step 26. The clustering step provides a description of each class as a conjunctive statement which involves the selected features. Because the classification will result in classes which can be symbolically understood, an Internal Revenue Service or state investigator can understand the definition of any of the classes which may result from the step. Classes of taxpayers are generated on the assumption that different types of taxpayers have different tendencies with respect to both the amount and type of fraud they are most likely to commit. In the application as described herein, each taxpayer can be classified and described in the form of a conjunctive statement which is logically disjoint from the descriptions of all other classes of taxpayers. By breaking the set of input data into different classes before processing by the neural network, the neural network can better detect the incidence of fraud because different classes of taxpayers tend to exhibit different types of fraud.

The classification into conceptually cohesive classes or the conceptual clustering step is a critical component of the architecture. In the contemplated tax fraud detection application, before presenting the data to the neural network stage 30, a second set of features or vectors must be selected from the taxpayer database 22 which are relevant to the solution of the problem—in this case, the detection of tax related fraud. In the preferred embodiment involving tax fraud detection exercise, a parser program is employed to determine the particular class of each event set and then assign the event set to the corresponding neural network. The parser program distributes or assigns the tax return to the particular neural network which has been trained for and corresponds to the respective class. In the event that a tax return does not correspond to any of the predetermined classes, it is assigned as a class 0 input. In the ensuing step, the neural networks receive data from each event in the form of a second set of predetermined vectors. The neural network will then provide an output in the form of an identification of whether there is or is not likely fraud in the tax return.

Figure 3:
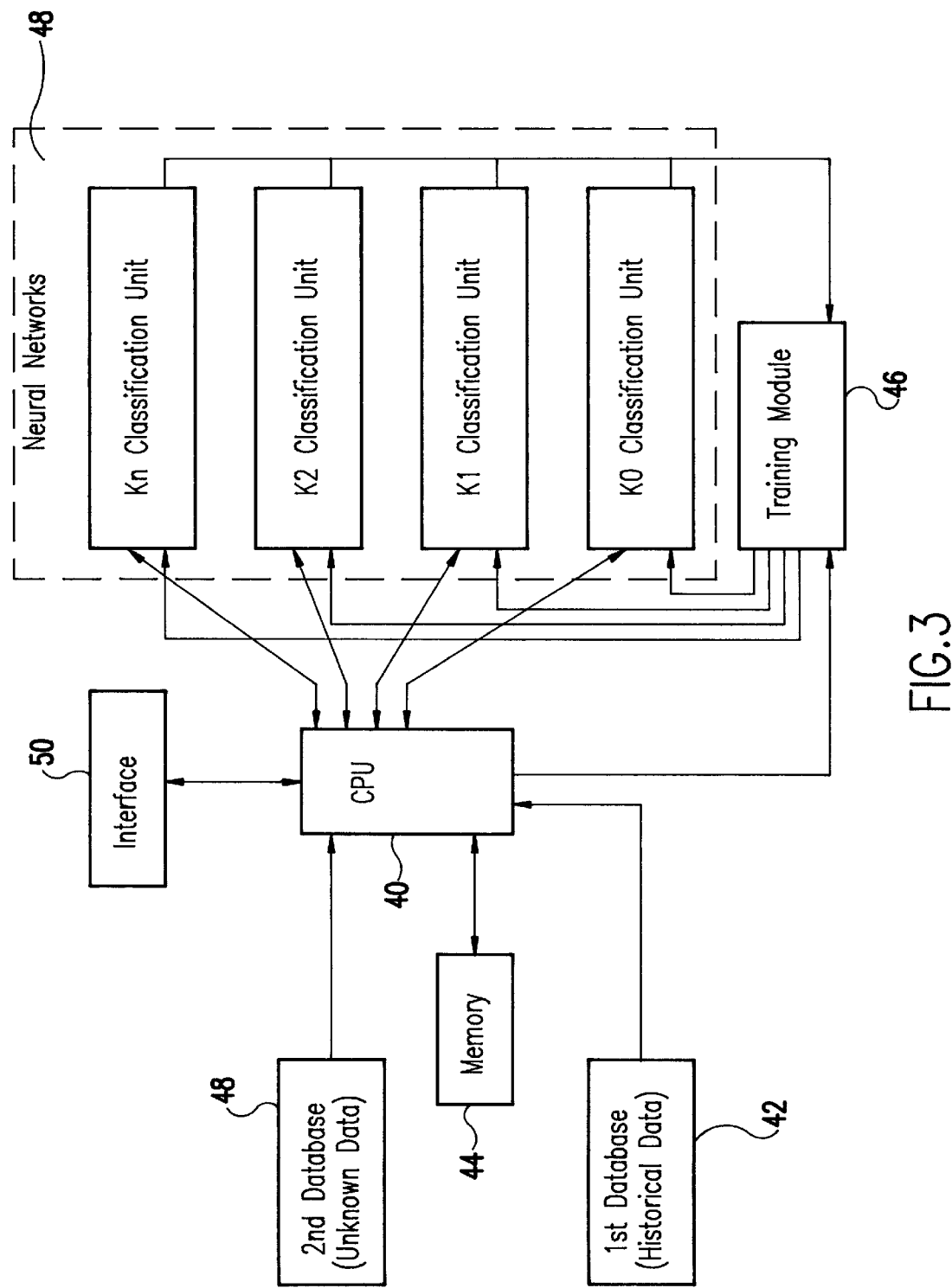
FIG. 3 is a block diagram illustrating an embodiment of the invention.

Referring now to FIG. 3, a schematic representation of a contemplated embodiment of the invention is shown. In response to a user command, a central processing unit ("CPU") 40 can access first database 42 which contains historical data having known characteristics and in response to a set of predetermined instructions, selects a first set of vectors. These vectors are provided as the input to the class assignment step which consists of the conceptual clustering algorithm performed by the CPU. The classes generated from the conceptual clustering step are then stored in memory 44. The CPU also effects the parser program which assigns events from the second database 48 to a class which corresponds to the characteristics of the events vectors. Also shown communicating with the CPU is the training module 46 which is programmed according to the training algorithm selected for the neural network phase of the invention. The neural networks, designated by reference numeral 48 can be implemented in hardware, software or a combination of both. After training, each of the classification units within the neural net will respond to a second class of vectors provided from the second database 48 as input and render an output reflecting the desired detection application. The output is then communicated at an appropriate user interface 50.

The methodology disclosed is able to significantly reduce the number of false positive identifications of potential fraudulent activity as compared to statistical methods. The practical implication of reducing the false positive rate is that field investigators will be able to significantly reduce the time spent on unproductive audits. At the same time, the agents can concentrate their efforts on the violators detected where fraud is likely to be discovered or investigate new schemes which have not yet been detected. The overall architecture of the system can dramatically improve the detection of fraud in connection with tax returns. Other applications of the system architecture include the detection of fraud in connection with insurance claims or in connection with the distribution of government benefits or entitlements. It is contemplated that the system could further be successfully employed to detect and classify other complex data patterns.

The foregoing description is considered as illustrative only of the principles of the invention. Since numerous modifications and changes will be apparent to those skilled in the art, the invention is not limited to the exact operation shown and described herein. Thus the scope of the invention is defined only by the terms of the following claims and art recognized equivalents thereof.

What is claimed is:

1. A method for the classification and detection of complex event spaces using a multi-stage integrated architecture, each event space being represented by a plurality of vectors, said method comprising, selecting a first set of vectors from a first set of data from a database, said first set of data being historical data with known characteristics, providing said first set of selected vectors to a first classification unit, said unit being responsive to said first set of vectors and employing a conjunctive conceptual clustering algorithm, wherein said classification unit provides a plurality of output signals in response to the input vectors each said output signal representing a class, providing neural networks for each said class created by said first classification unit, selecting a second set of vectors from said first set of data for at least one class generated by said first classification unit, training said neural networks with said second set of vectors to reflect a desired output, whereby detection architecture is created, and providing said detection architecture with a second set of data with unknown characteristics, processing said unknown data with said classification unit by first classifying said data into one of said classes created by said clustering algorithm, and then providing said data to one of said neural networks corresponding to its classification to produce an output signal which reflects a final classification.

2. The classification method recited in claim 1 wherein each event space comprises information from a tax return.

3. The classification method recited in claim 1 wherein each event space comprises information from an insurance claim.

4. The classification method recited in claim 1 wherein each event space comprises information from a claim for benefits.

5. The classification method recited in claim 1 wherein said output signal reflects a final classification indicating the potential incidence of fraud in the event space.

6. The classification method recited in claim 1 wherein said neural networks are trained using a cascade correlation algorithm.

7. A classification and detection architecture for detecting patterns from very large amounts of data comprising a first database containing historical data representing a plurality of events, with some of said events having patterns previously identified, a second database containing data which is to be processed representing a plurality of events having unknown patterns, selection means to select a first set of vectors from said historical data appropriate for conceptual classification, assignment means to provide said first set of vectors to a first classification step, said first classification step further comprising a conceptual clustering algorithm whereby said historical events from said first database are classified into a plurality of symbolically understood and conceptually cohesive classes, memory means to store said classes, a plurality of second classification units, each said classification unit corresponding to classes identified by first said classification unit, said second classification units comprising neural networks, said neural networks trained in a supervised manner using historical data from said first database and trained to provide output signals reflecting the result classification in response to input signals, data processing means wherein said data from said second database is first classified according to one of the classes stored in said memory and then assigned to a neural network corresponding to said class, interface means to display said output signals reflecting the result classification from said neural networks to a user interface.

8. The classification and detection architecture as recited in claim 7 wherein each said event comprises information provided on a tax return.

9. The classification and detection architecture as recited in claim 7 wherein each said event comprises information provided on an insurance claim.

10. The classification and detection architecture as recited in claim 7 wherein each said event comprises information provided on a benefits claim.

11. The classification and detection architecture as recited in claim 7 wherein said output signal reflects a classification indicating the potential incidence of fraud in the event.

12. The classification and detection architecture as recited in claim 7 wherein said neural networks are trained using a cascade correlation algorithm.

13. An integrated multi-stage classification system for the detection of fraud in an event, said system comprising;

a parser program to first assign an event to one of a plurality of predetermined classes, said classes predetermined by a conceptual clustering program, said conceptual clustering program provided with input from an event set comprising historical events, wherein in response to data from predetermined vectors said conceptual clustering step provides an output signal reflecting a plurality of classes;

a second stage comprising assigning said event to one of a plurality of neural networks, each said network corresponding to a class defined by said conceptual clustering program, each said neural networks trained by a cascade correlation algorithm, wherein in response to data from a second set of predetermined vectors said second stage provides an output signal which reflects whether the event likely contains fraudulent activity.

14. The classification method recited in claim 1 wherein the selection of said first and second set of vectors is determined using genetic algorithms.

15. The classification method recited in claim 1 wherein the selection of said first and second set of vectors is determined using expert knowledge.

* * * * *